United States Patent [19]

Satoh et al.

[11] Patent Number: 4,567,768
[45] Date of Patent: Feb. 4, 1986

[54] ULTRASONIC IMAGE OUTPUT APPARATUS

[75] Inventors: Ichiro Satoh, Tochigi; Minoru Satoh, Ootawara, both of Japan

[73] Assignee: Kabushiki Kaisha Toshiba, Japan

[21] Appl. No.: 690,124

[22] Filed: Jan. 10, 1985

[30] Foreign Application Priority Data

Jan. 18, 1984 [JP] Japan .................................. 59-5533

[51] Int. Cl.$^4$ .......................................... G01N 29/06
[52] U.S. Cl. ........................................ 73/606; 73/620
[58] Field of Search ........................ 73/606, 607, 620; 367/7, 11; 128/660; 358/112

[56] References Cited

U.S. PATENT DOCUMENTS 4,381,675  5/1983  Roberts et al. ...................... 73/606

FOREIGN PATENT DOCUMENTS 0017372  10/1980  European Pat. Off. .............. 73/606

Primary Examiner—Stephen A. Kreitman
Attorney, Agent, or Firm—Finnegan, Henderson, Farabow, Garrett & Dunner

[57] ABSTRACT

An ultrasonic image output apparatus has a frame memory for storing image data for each frame of ultrasonic images. The image data stored in the frame memory is read out in a time-division manner to be transferred to a display and a scanning/recording device to be displayed and recorded. For the time-divisional data transfer to the display, data is read out from the frame memory by, for example, scanning in accordance with the standard television format. Data is read out and transferred to the scanning/recording device during a blanking period of the scanning operation by the standard television format. The time-divisional data read operation is controlled by a timing circuit synchronously with display scanning of the display.

5 Claims, 5 Drawing Figures

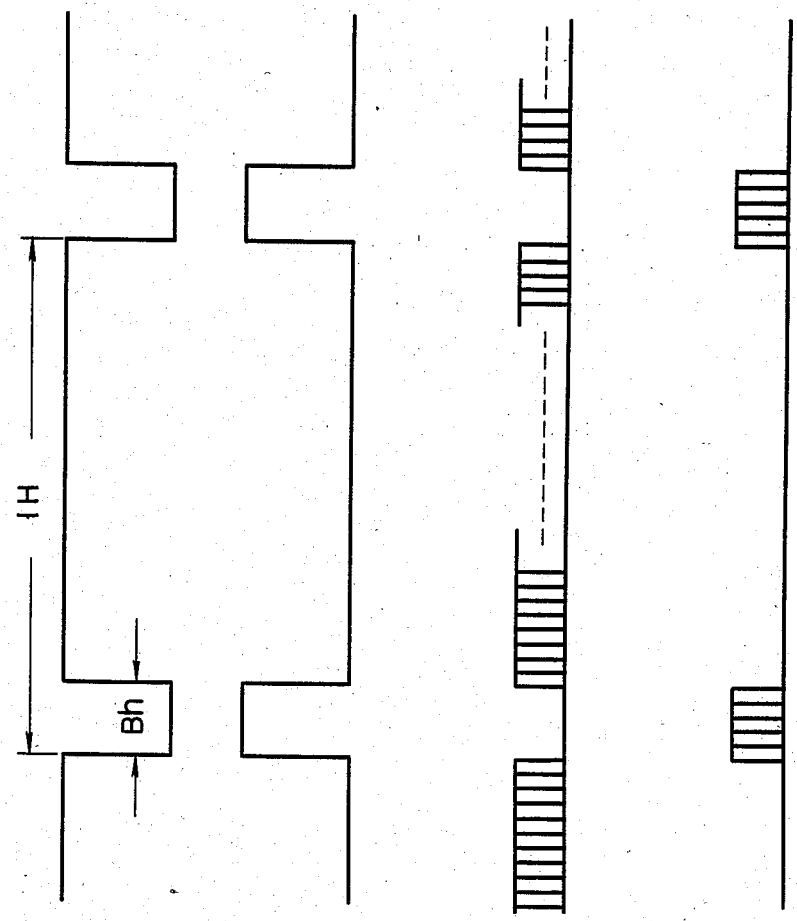

ULTRASONIC IMAGE OUTPUT APPARATUS

BACKGROUND OF THE INVENTION

The present invention relates to an ultrasonic image output apparatus having a function for displaying, as an ultrasonic image, information obtained by transmitting/receiving an ultrasonic wave to/from an object to be examined or reproduction data from an image recording/reproducing device such as a video tape recorder (VTR) which records the data, and a function for displaying a desired frame of the ultrasonic image as a still image and recording it as a hard copy.

In an ultrasonic diagnosing apparatus, information obtained by transmitting/receiving an ultrasonic wave to/from an object is generally displayed as an ultrasonic image, mainly as a slice image. When the ultrasonic image is displayed, an image data signal obtained by ultrasonic scanning is converted into a video signal for television scanning by a so-called scan converter and the video signal is supplied to a display system.

In a conventional ultrasonic diagnosing apparatus, ultrasonic images derived from information obtained by transmitting/receiving an ultrasonic wave to/from an object are temporarily stored as a video signal in an image recording/reproducing device such as a VTR, and the ultrasonic images reproduced from the VTR are displayed on a cathode ray tube (CRT), thus allowing diagnosis. In an ultrasonic diagnosing apparatus of this type, a size or an area of a desired portion of a still image from a desired frame of an ultrasonic image stored in a memory as the video signal can be measured, i.e., calipered. With this apparatus, diagnosis or measurement can be performed after examination by using the ultrasonic image recorded in the VTR.

Another ultrasonic diagnosing apparatus can record an M mode image such as an ultrasonic cardiograph (UCG) using a recording device, e.g., a line scan recorder. The line scan recorder, for example, records a line scan image by moving continuous photosensitive recording paper in units of scanning lines using an optical fiber tube. In addition, in an ultrasonic diagnosing apparatus of this type, a desired frame of the ultrasonic image is temporarily stored in a memory and a hard copy can be formed by the line scan recorder. In this apparatus, in order to form the hard copy, a line image signal is supplied to the line scan recorder in accordance with a recording speed thereof. For reference in the next examination, the hard copy can be utilized for keeping records of ultrasonic still images.

In the conventional ultrasonic diagnosing apparatus which can make a hard copy of a desired frame with a line scan recorder, a video signal of the ultrasonic image from the VTR is converted into digital data by an analog/digital (A/D) converter and is then written in a frame memory. The image data written in the frame memory is read out and converted into an analog signal by a digital/analog (D/A) converter. This analog signal is supplied to a display. When a writing operation in the frame memory is terminated, a displayed image is frozen into a still image. When the image data is read out from the frame memory in order to be supplied to the display, it is partially or entirely written in a buffer memory. Information in the buffer memory is read out in accordance with the recording speed of the line scan recorder and converted into an analog signal by the D/A converter so as to be recorded by the line scan recorder.

The line scan recorder uses continuous recording paper. For this reason, when an M mode image is recorded directly on the recording paper, the longitudinal direction of the paper corresponds to a time base direction and the transverse direction thereof corresponds to the vertical direction of the M mode image. Therefore, when ultrasonic images are recorded along the same direction as the M mode image, all the images on the recording paper are aligned in the same direction, thus allowing for easy operation. In the apparatus of this type, since a scanning line direction of the video signal differs by 90 degrees from that of the line scan recorder, scan conversion must be performed by the buffer memory. For example, when a buffer memory has a capacity corresponding to one vertical line of the video frame, every time the video signals of one frame are read from the buffer memory for transfer to the display, one vertical line of pixel data of the video frame is written in the buffer memory. The pixel data is written in the buffer memory by sampling in synchronism with the transfer of the corresponding pixels to the display. The one vertical line of pixel data is supplied to the line scan recorder so that the image data for one line is recorded thereby. This sampling operation is repeated for each read operation of the frame to the display. When the sampling operation is repeated for the number of times corresponding to the number of pixels for one horizontal line, the recording operation of the image for one frame ends. In this case, a recording speed is determined by a frame repeating period of the video signal (e.g., about 33.3 ms) and the number of pixels in one horizontal line of the video frame. For this reason, even if the line scan recorder has a sufficient margin in speed, the recording speed cannot be increased. In addition, a complicated synchronous sampling process is required for fetching the data in the buffer. In this case, in order to increase the recording speed, the capacity of the buffer memory is increased so as to correspond to several vertical lines of the video frame. However, a memory having a large capacity is needed, and the sampling operation and the write/read control of the memory become cumbersome. Since the video signal is obtained by interlaced scanning, sampling is more complicated than that of noninterlaced scanning.

If the scanning direction of the video signal coincides with that of the line scan recorder, the video signal can be read without sampling a predetermined number of pixel data in a scanning line of the video frame. However, a scanning speed along a longitudinal direction of the recording paper of the line scan recorder is determined by a feeding speed of the paper, which is slower than the vertical scanning speed of the video signal. For this reason, buffering by means of a memory is needed. In addition, as described above, the video signal is obtained by interlaced scanning. Therefore, in order to record a video signal by a line scan recorder which performs substantially noninterlaced scanning, a buffer memory having a capacity of at least one field is required. Furthermore, in this case, since the vertical direction of the video image corresponds to the longitudinal direction of the recording paper, it is different from the recording direction of the M mode image, resulting in inconvenience.

SUMMARY OF THE INVENTION

It is an object of the present invention to provide an ultrasonic image output apparatus in which an ultrasonic image is displayed on a display and is recorded by a line scan recorder, and a hard copy of the ultrasonic image can be recorded along an appropriate direction at high speed by a scanning/recording device, e.g., a line scan recorder.

The ultrasonic image output apparatus according to the present invention comprises a frame memory for storing image data for each frame of the ultrasonic image, and the image data stored in the frame memory is read out therefrom in a time-division manner so as to be transferred to a display or a scanning/recording device (a recording device which performs recording by scanning), e.g., a line scan recorder, thus being displayed and recorded. Data is read out from the frame memory and transferred to the display in a scanning mode in accordance with a standard television format (e.g., National Television System Committee (NTSC) format). Data is read out from the frame memory and transferred to the line scan recorder during a blanking period according to the standard television format. The time-divisional data read control by a reading control device is performed in synchronism with a display scanning operation of the display.

According to the ultrasonic image output apparatus of the present invention, a frame memory for each frame is commonly used as a frame buffer both for displaying and recording. In addition, since the frame memory is independently accessed to read out data in the displaying and recording modes, only a small number of memory elements is required, thus simplifying an arrangement of the apparatus. Furthermore, with an ultrasonic image output apparatus of the present invention, since the frame memory is independently accessed in the respective data read operations for displaying and recording, the image of an M mode image recorded by the scanning/recording device such as a line scan recorder can be aligned with that of a hard copy of the ultrasonic image, thus achieving a high recording speed of the hard copy.

BRIEF DESCRIPTION OF THE DRAWINGS

FIGS. 2A to 2D are timing charts for explaining a time-divisional data read operation of a frame memory shown in FIG. 1.

DETAILED DESCRIPTION OF THE PREFERRED EMBODIMENT

Figure 1:
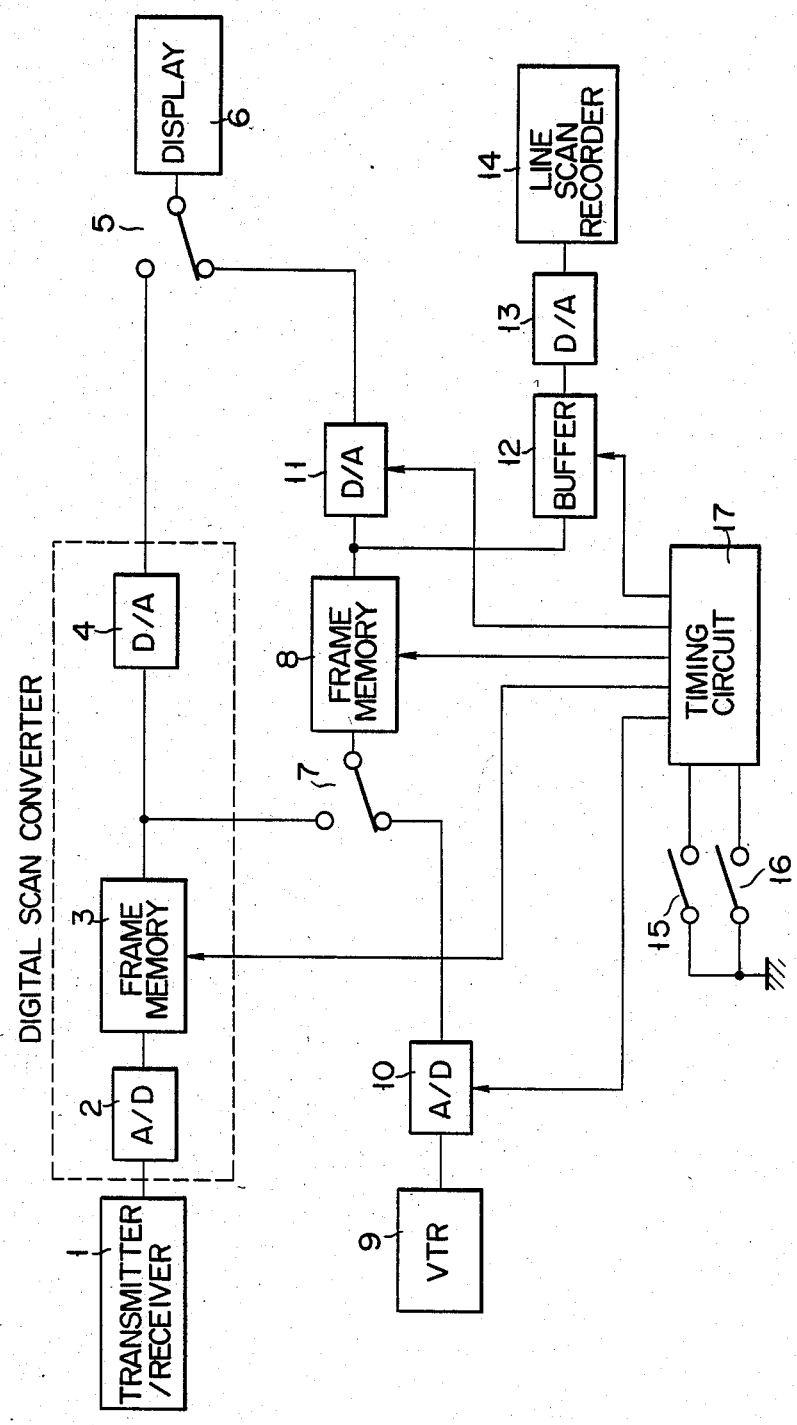
FIG. 1 is a block diagram of an ultrasonic image output apparatus according to an embodiment of the present invention.

In FIG. 1, an ultrasonic wave is transmitted/received with respect to an object to be examined by a transmitter/receiver 1. An ultrasonic echo signal is received and detected by the transmitter/receiver 1 and subjected to a desired process. Thereafter, the ultrasonic echo signal is digitized by a first A/D converter 2 and is written in a first frame memory 3. Information in the frame memory 3 is read out in a scanning mode, which differs from the ultrasonic scanning mode in the write mode, e.g., a scanning mode in accordance with the standard television method. The readout data from the frame memory 3 is converted into analog data by a first D/A converter 4. The A/D converter 2, the frame memory 3 and the D/A converter 4 constitute a digital scan converter. An output from the D/A converter 4 is supplied to a display 6 through a first switch 5 so as to be displayed. An output from the frame memory 3 is supplied to a second frame memory 8 through a second switch 7. A video tape recorder (VTR) 9 reproduces an ultrasonic image recorded on a tape. The reproduction output from the VTR 9 is converted into a digital signal by a second A/D converter 10. An output from the A/D converter 10 is supplied to a frame memory 8 through the switch 7. The switch 7 is used for selecting either of the outputs from the frame memory 3 and the A/D converter 10. The data selected by the switch 7 is supplied to the frame memory 8. An output from the frame memory 8 is converted into analog data by a second D/A converter 11. An output from the D/A converter 11 is supplied to the display 6 through the switch 5 so as to be displayed thereon. The switch 5 is used for selecting the outputs from the D/A converters 4 and 11. An output from the frame memory 8 is supplied to a buffer memory 12. An output from the buffer memory 12 is supplied to a line scan recorder 14 as a scanning/recording device through a third D/A converter 13. A freeze switch 15 is provided for inputting a command for freezing a display image. A record switch 16 is provided for inputting a command for recording a hard copy of the frozen display image by the line scan recorder 14.

A timing circuit 17 for controlling a write/read operation controls the frame memory 8. The timing circuit 17 controls data transfer from either the frame memory 3 or the A/D converter 10, which is selected by the switch 7, to the frame memory 8. The timing circuit 17 also controls data transfer from the frame memory 8 to the D/A converter 11 and time-divisional data transfer to the D/A converter 11 and the buffer memory 12. In addition, the timing circuit 17 stops the data write operation in the frame memory 8 in response to the operation of the freeze switch 15, and transfers data from the frame memory 8 to the buffer memory 12 in response to the operation of the record switch 16.

The operation of the ultrasonic image output apparatus having such a configuration will be described hereinafter.

The ultrasonic echo signal is received and detected by the transmitter/receiver 1 and is subjected to a desired process. Thus, the scanning mode of the ultrasonic echo signal is converted from the ultrasonic scanning mode into the television scanning mode by the digital scan converter consisting of the A/D converter 2, the frame memory 3 and the D/A converter 4. The video signal of the ultrasonic image which is converted in the television scanning mode is supplied to the display 6 through the switch 5 so as to be displayed thereon. This is the normal display state of the ultrasonic image.

In FIG. 1, an arrangement for recording the ultrasonic image is not specifically shown. However, when, for example, the output from the D/A converter 4 is supplied to the VTR 9, the recording operation is performed.

The switch 5 selects either the D/A converter 4 for the normal display state or the D/A converter 11 for the state enabling a specific operation such as freeze display or image recording by the line scan recorder 14.

The state wherein the switch 5 selects the D/A converter 11 will be described hereinafter.

Either the data of the ultrasonic image read out from the frame memory 3 of the digital scan converter or the data of the ultrasonic image obtained from the VTR 9 and digitally converted by the A/D converter 10 is selected by the switch 7 and is written in the frame memory 8. The contents of the frame memory 8 are read out in the television scanning mode in synchronism with the display scanning operation of the display 6.

The readout data is then converted into analog data and is supplied to the display 6 through the switch 5. In this case, the display 6 is in the normal display state as long as an updating operation of the frame memory 8 is performed. When an operator operates the freeze switch 15, the write operation in the frame memory 8 is terminated, and the image data stored in the frame memory 8 is no longer updated. Thus, the display image on the display 6 in accordance with the image data read out from the frame memory 8 and transferred through the D/A converter 11 is frozen and turned into a still image.

In this state, when the operator operates the record switch 16, the image data read out from the frame memory 8 is transferred to the line scan recorder 14 through the buffer memory 12 and the D/A converter 13 and recorded. Note that the frame memory 8 has, for example, 525×525 pixels. When a command for forming a hard copy has not been supplied from the record switch 16, the stored image in the frame memory 8 is read out for each horizontal line corresponding to horizontal scanning in the television scanning mode, and is transferred to a display system (i.e., to the display 6 through the D/A converter 11 and the switch 5). On the other hand, when the recording command is supplied from the record switch 16, the data stored in the frame memory 8 is read out in units of pixel data arrays along a direction corresponding to a vertical direction of the screen (i.e., the vertical scanning direction of the television scanning operation), and is transferred to a recording system (i.e., to the line scan recorder 14 through the buffer memory 12 and the D/A converter 13). These data read operations and the timings thereof are controlled by the timing circuit 17, as described above. Data is time-divisionally read out from the frame memory 8 under the control of the timing circuit 17. Thus, the data for display is read out so as to correspond to the television scanning operation, and the data for recording is read out during an interval corresponding to the blanking period of the television scanning operation. In this case, the recording data is read out along a direction differing by 90 degrees with respect to the screen. During the horizontal and vertical scanning periods of the television scanning operation, recording data of a predetermined number of pixels which can be read out in these periods is read out. The recording data is first read out along the vertical direction of the screen. When data for one vertical line has been read out, the data for an adjacent line is read out. Similarly, the image data for respective lines are read out from the left to the right of the screen. For example, one line of recording data can be read out during a thirty-line horizontal scanning operation for display. The data read operation is performed in accordance with a recording speed. The readout data is temporarily stored in the buffer memory 12, e.g., in units of vertical lines of the recording scanning operation. The data stored in the buffer memory 12 is transferred to the line scan recorder 14 through the D/A converter 13. The data read operations for the display and recording systems are performed in a time-division manner. However, since data reading for the recording system is performed during a blanking period of the data read operation for the display system, it seems as if these operations are performed parallel to each other.

The time-divisional reading process of data from the frame memory 8 can be performed, for example, in the following manner. A waveform of a readout data signal from the frame memory 8 to the display system is shown in FIG. 2A, and a waveform of a readout data signal from the frame memory 8 to the recording system is shown in FIG. 2B. The data is read out from the frame memory 8 to the display system in response to the signal in FIG. 2A during an interval, except for a vertical blanking period Bh in one horizontal scanning period 1H of the television scanning operation. An output waveform supplied to the D/A converter 11 is as shown in FIG. 2C. The data is read out from the frame memory 8 to the recording system during the horizontal blanking period Bh of the television scanning operation. An output waveform supplied to the buffer memory 12 is as shown in FIG. 2D.

Note that an arrangement for recording an M mode image by the line scan recorder is not shown. However, the output from the A/D converter 2 is supplied to the buffer memory 12, and echo signal information for each pulse of the ultrasonic wave from the transmitter/receiver 1 is transferred by the buffer memory 12, thus recording the M mode image.

In this manner, since the data read operations from the frame memory 8 to the display and recording systems are performed in a time-division manner, the frame memory 8 can be commonly used as a memory for freezing an image in the display system and as a main buffer for the recording system, resulting in a simple apparatus. Furthermore, in this case, since the frame memory 8 is independently accessed in data read operations by the display and recording systems, the vertical direction of the image recorded by the line scan recorder can correspond to the widthwise direction of the recording paper. In addition, since the frame memory 8 is independently accessed by the display and recording systems, an access speed for recording can correspond to the recording speed of the line scan recorder 14. For this reason, the capacity of the buffer memory 12 can be one or two lines of the line scan recorder 14 (when the buffer memory 12 having a capacity for two lines is used, the write/read operation thereof is alternately performed, thus achieving high speed process), resulting in a compact circuit configuration.

The present invention is not limited to the above embodiment and various changes and modifications may be made within the spirit and scope of the present invention.

For example, the buffer memory 12 shown in FIG. 1 can be omitted when a time required for reading out the data from the frame memory 8 corresponds to input conditions of the line scan recorder 14.

Furthermore, buffer memories can be provided to respective data transfer portions as needed.

Furthermore, an arrangement for measuring a size or an area of a frozen display image on the display 6 can be added to that of FIG. 1.

What is claimed is:

1. An ultrasonic image output apparatus comprising:
generating means for generating a frame of ultrasonic image data;
memory means connected to said generating means for storing the ultrasonic image data at pixel storage locations which are arranged in columns and rows;
display means connected to said memory means for reading the ultrasonic image data from said memory means by accessing said pixel storage locations, and displaying the ultrasonic image represented by said data in a television format; and line scan recording means connected to said memory means for reading the ultrasonic image data from said memory means by accessing at least one of the pixel storage locations of a line in column direction or row direction during each blanking period of said television format, and recording the line of the ultrasonic image formed of the pixels corresponding to the storaged locations which have been accessed.

2. The apparatus according to claim 1, wherein said display means reads the ultrasonic image data in the row direction of the television format, and said line scan recording means reads the ultrasonic image data in the column direction of the television format.

3. The apparatus according to claim 1, wherein said line scan recording means includes a buffer memory means for storing at least one column or row pixels.

4. The apparatus according to claim 1, wherein said generating means includes an ultrasonic imaging device for scanning an object with an ultrasonic beam to provide the image data.

5. The apparatus according to claim 1, wherein said generating means includes a video tape recorder for reproducing the ultrasonic image.

* * * * *